United States Patent [19]

Einhaus

[11] Patent Number: 4,701,903
[45] Date of Patent: Oct. 20, 1987

[54] AUTOMATIC RECORD PLAYER PICK-UP ARM CONTROL DEVICE HAVING MINIMAL HEIGHT

[75] Inventor: Hermanus F. Einhaus, Eindhoven, Netherlands

[73] Assignee: U.S. Philips Corporation, New York, N.Y.

[21] Appl. No.: 926,852

[22] Filed: Nov. 3, 1986

Related U.S. Application Data

[63] Continuation of Ser. No. 837,670, Mar. 10, 1986, abandoned, which is a continuation of Ser. No. 680,416, Dec. 11, 1984, abandoned.

[30] Foreign Application Priority Data

Dec. 16, 1983 [NL]  Netherlands ................... 8304334

[51] Int. Cl.$^4$ .................... G11B 3/10; G11B 17/08
[52] U.S. Cl. .................... 369/216; 369/225
[58] Field of Search .................... 369/216, 225

[56] References Cited

U.S. PATENT DOCUMENTS

| | | | |
|---|---|---|---|
| 2,752,159 | 6/1956 | Bacher | 369/216 |
| 3,433,486 | 3/1969 | Kawaharazaki | 369/216 |
| 3,697,087 | 10/1972 | Takahashi | 369/216 |
| 4,346,465 | 8/1982 | Dennis et al. | 369/225 |
| 4,348,756 | 9/1982 | Decoster | 369/216 |
| 4,356,561 | 10/1982 | Ikeda | 369/225 |

Primary Examiner—Steven L. Stephan
Attorney, Agent, or Firm—David R. Treacy

[57] ABSTRACT

A control device having a reciprocable drive element connected to a record command disc, a pick-up arm set down position selection member, and a guide element pivotally connected to the drive element for engaging a coupling element on a pick-up arm base to guide the pick-up arm pivoting toward the turntable. The guide element is pivotable with respect to the drive element between two stable positions. In the first stable position during forward movement of the drive element, the guide element passes an abutment on the pick-up arm base, and is then pivoted to the second stable position. During a turn movement of the drive element, the guide element first pivots the pick-up arm into abutment with a set-down position selection surface, and the guide element then pivots out of engagement with the abutment. Upon completion of the drive element return movement, the guide element is pivoted into the first stable position.

31 Claims, 17 Drawing Figures

AUTOMATIC RECORD PLAYER PICK-UP ARM CONTROL DEVICE HAVING MINIMAL HEIGHT

This is a continuation of application Ser. No. 837,670, filed Mar. 10, 1986, which is a continuation of application Ser. No. 680,416, filed Dec. 11, 1984, both now abandoned.

The invention relates to a record player comprising a pick-up arm control device, which comprises a command disc which is rotatable by a motor, a reciprocable drive element connected to the command disc, a guide element pivotably connected to the drive element at an end thereof remote from the command disc, a coupling element on a base of the pick-up arm engageable with guide element to guide the pick-up arm towards the turn-table, and a pivotal selection member having first and second positioning surfaces which are selectively cooperable with an abutment coupled to the pick-up arm in order to position the pick-up arm selectively in a first or second position above the turntable.

Such a record player is disclosed in U.S. Pat. No. 2,752,159. In this known record player the drive element is connected to a pivotal member which is pivoted away from the coupling element on the pick-up arm base under the influence of the rotation of the command disc. As a result, the guide element can also perform a pivotal movement under spring force, the pick-up arm being moved towards the turntable by the coupling element. At the instant at which the abutment, which is arranged on the guide element in the known record player, contacts one of the positioning surfaces on the selection member said pivotal member is clear of the coupling element, so that in this position of the guide element the pick-up arm movement may continue, for example due to vibrations, and as a result the pick-up arm may be set down at an incorrect position on the disc to be played. Further, when the rotation of the command disc has been completed it may happen that the pivotal member acts against the coupling element at an undesired instant after the pick-up arm has been positioned above the turntable, which is also undesirable.

SUMMARY OF THE INVENTION

It is the object of the invention to construct a control device in a record player of the specified type using cheap and reliably operating parts in such a way that the pick-up arm is positioned correctly above the turntable.

To this end the invention is characterized in that the abutment is arranged on the pick-up arm base, the guide element is pivotable between two stable positions, namely, an inoperative first position which it occupies during the forward movement of the drive element and an operative second position which it occupies during at least part of the return movement of the drive element, and the guide element is engageable with the coupling element to guide the pick-up arm in said second position only. At the end of the forward movement of the drive element the guide element abuts a stop so as to be pivoted by the stop to the second position, during the return movement of the drive element. After abutment of the abutment on the pick-up arm base with a selected one of the positioning surfaces on the selection member, the guide element is pivoted out of the second position and is thus disengaged from the coupling element on the pick-up arm base. After the guide element has been disengaged from the coupling element the command disc pivots the selection member to move the selected positioning surface out of the path of the abutment on the pick-up arm base.

This produces a control device by which the pick-up arm base is briefly retained between the guide element and the relevant positioning surface on the selection member during positioning of the pick-up arm above the turntable. This arrangement ensures that the pick-up arm is set down exactly at the predetermined position on the record. Thus, the moving mass of the pick-up arm is controlled effectively and vibrations and/or shocks exerted on the record player cannot affect the operation. Arranging the abutment directly on the pick-up arm base has the further advantage that the effect of tolerances of the parts used in the control device during positioning of the pick-up arm is minimal. Another advantage is that after each positioning the guide element is pivoted away from the coupling element towards the inoperative first position and the selection member is pivoted out of the path of the abutment on the pick-up arm base, so that as the command disc rotates further the guide element and the selection member cannot impede the movements of the pick-up arm. The parts used in the control device can be of simple construction and can have a minimal mounting height, thereby minimizing the height of the record player in accordance with the invention.

A preferred embodiment of the invention is characterized in that during disengagement of the guide element and the coupling element the selection member is positioned under spring force by means of an actuating element which can be set selectively in one or the other of two positions, in which the first or the second positioning surface is in an operative position. This enables the selection member to be positioned at the desired instant by means of an actuating button on the outside of the record player, while it remains possible to pivot the selection member into an inoperative position outside the path of the abutment on the pick-up arm base after the pick-up arm has been lowered onto the record.

Another preferred embodiment of the invention is characterized in that the stop for the guide element is arranged on the selection member and can be moved between an operative and an inoperative position by pivoting the selection member. This arrangement of the stop for the guide element ensures that for guiding the pick-up arm to the turntable the guide element is pivoted to the operative second position at the correct instant and that the stop for the guide element is also inoperative at the instant that the selection member has been pivoted to the inoperative position. This last-mentioned aspect is important for returning the pick-up arm after the record has been played, in order to prevent the guide element from directing the pick-up arm back to the turntable immediately after it has been returned. In this respect a preferred embodiment is characterized in that the stop for the guide element comprises a hook-shaped projection at the free end of the selection member. This arrangement of the stop at the free end of the selection member enables a substantial displacement of the stop to be obtained, and thus precludes an erroneous change-over of the guide element from the inoperative position to the operative position.

A further preferred embodiment of the invention is characterized in that during the return movement of the drive element, after disengagement from the coupling element, the guide element abuts a fixed reset surface to be pivoted thereby to the first position. The reset surface ensures that after every disengagement of the coupling element the guide element is pivoted back to the inoperative position. This step ensures that the guide element is inoperative during the subsequent stage of the command-disc movement.

Another preferred embodiment of the invention is characterized in that a spring-loaded pivotal starting member has an abutment which is in an inoperative position when the pick-up arm is moved towards the turntable and which is in an operative position opposite a cooperating part of the selection member when the pick-up arm is moved away from the turntable, so that the selection member is in a pivoted position and the positioning surfaces and the stop for the guide element on the selection member are in their operative positions outside the path of the abutment on the pick-up arm base and the guide element respectively. The presence of the starting member with the abutment surface ensures that when the pick-up arm is moved away from the turntable the selection member is kept in the inoperative position, so that both the guide element and the abutment on the pick-up arm base remain inoperative when the pick-up arm is moved away from the turntable.

In this respect yet another preferred embodiment of the invention is characterized in that the starting member comprises a latching hook which engages behind a shoulder on a pivotal switching member when the pick-up arm is moved towards the turntable in the inoperative position of the abutment on the starting member, and the switching member releases the starting member under the influence of the command disc when the pick-up arm has been positioned above the turntable. Thus, the command disc releases the starting member by way of the switching member, so that the starting member can then keep the selection member in the inoperative position when the pick-up arm is moved away from the turntable.

Embodiments of the invention will be described in more detail, by way of example, with reference to the drawings.

DESCRIPTION OF THE PREFERRED EMBODIMENTS

Figure 1:
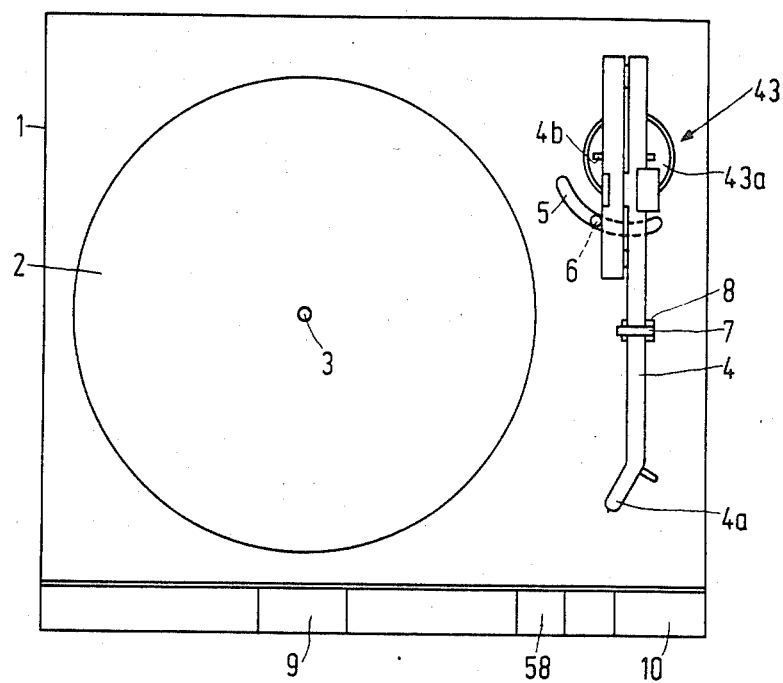
FIG. 1 is a plan view of a record player in accordance with the invention.

The record player shown in FIG. 1 comprises a deck 1 on which a turntable 2 is mounted for rotation by means of a turntable shaft 3. The turntable 2 is driven by a central drive motor, not shown. The upper side of the deck 1 carries a pick-up arm 4, provided with a pick-up head 4a for playing a record on the turntable 2 by means of a stylus. The pick-up arm 4 is pivotable up and down relative to the deck 1 about a horizontal pivot spindle 4b and is pivotable laterally about a vertical pivot 44 defining a pivotal axis 4c (see FIG. 2). An arcuate lift support 5 is arranged underneath the arm 4 and is situated on the upper end of a lift spindle 6 which is movably guided in the deck 1. The arm 4 can be retained in a rest position by means of a clip 7 provided on an arm rest 8. The deck 1 further carries a number of actuating buttons including a diameter-selection button 9 and a start button 10. In a manner not shown, the diameter-selection button is also coupled to a change-over device for the drive in order to switch the speed at which the turntable 2 is driven between 33⅓ and 45 revolutions per minute.

Arranged underneath the deck 1 (see FIG. 2) are a gear wheel 11 which is rigidly connected to the turntable shaft 3 and a command disc 12 which is rotatable through 360° about an axis 12a which extends parallel to the shaft 3. The command disc is provided with teeth 13 which mesh with the gear wheel 11 during the movement of the pick-up arm 4 towards and away from the turntable 2 by means of a control device to be described hereinafter. In the rest position and when a record is being played the gear wheel 11 faces an untoothed portion 14 of the periphery of the command disc 12 so that the gear wheel 11 cannot drive the disc 12. The command disc 12 carries a crank pin 15 which extends parallel to the turntable shaft 3. A drive element comprising a driving rod 16 is pivotally connected at one end to the crank pin so that the rod 16 can be reciprocated by rotating the disc 12. Near its end which is remote from the spindle 15 the rod 16 is provided with a guideway 16a on which the lower end of the lift spindle 6 engages.

On its upper side the command disc 12 has a raised cylindrical rim 17 with an outwardly protruding portion which forms a cam surface 18 and a re-entrant portion which forms a recess 19 in the outer surface of the rim. In the rest position shown in FIG. 2 a hook portion 20 of a switching member 21 which is pivotable intermediate its ends about a spindle 22 engages in the recess 19. A spring 23 tends to pivot the member 21 in the direction indicated by the arrow A, so that the hook portion 20 occupies a stable position in the recess. The member 21 carries an electrical switch 24 which is connected to the drive motor by wires 25. In the rest position shown in FIG. 2 the switch is positioned against a projection 24a which is controlled by the pick-up arm 4. In this position the projection 24a keeps the switch 24 open and thus keeps the drive motor switched off in the rest position.

At its periphery the command disc 12 is provided with an arcuate guide rim 26 which extends through an arc of approximately 150° and which has a re-entrant portion forming a recess 27 in the outer surface of the rim. In the situation shown in FIG. 2 a rounded protrusion 28 on a pivotable selection member 29 engages the recess 27. The member 29 is pivotable intermediate its ends about the spindle 22, a spring 30 tending to pivot the member 29 in the direction indicated by the arrow B, so that in the rest position the protrusion 28 is firmly retained in the recess 27 in the rest position. The member 29 further comprises two positioning surfaces 31 and 32 (see FIG. 3) for positioning the pick-up arm 4 in a manner to be described hereinafter when a stylus carried by the pick-up head 4a is set down on a record on the turntable 2.

Figure 2:
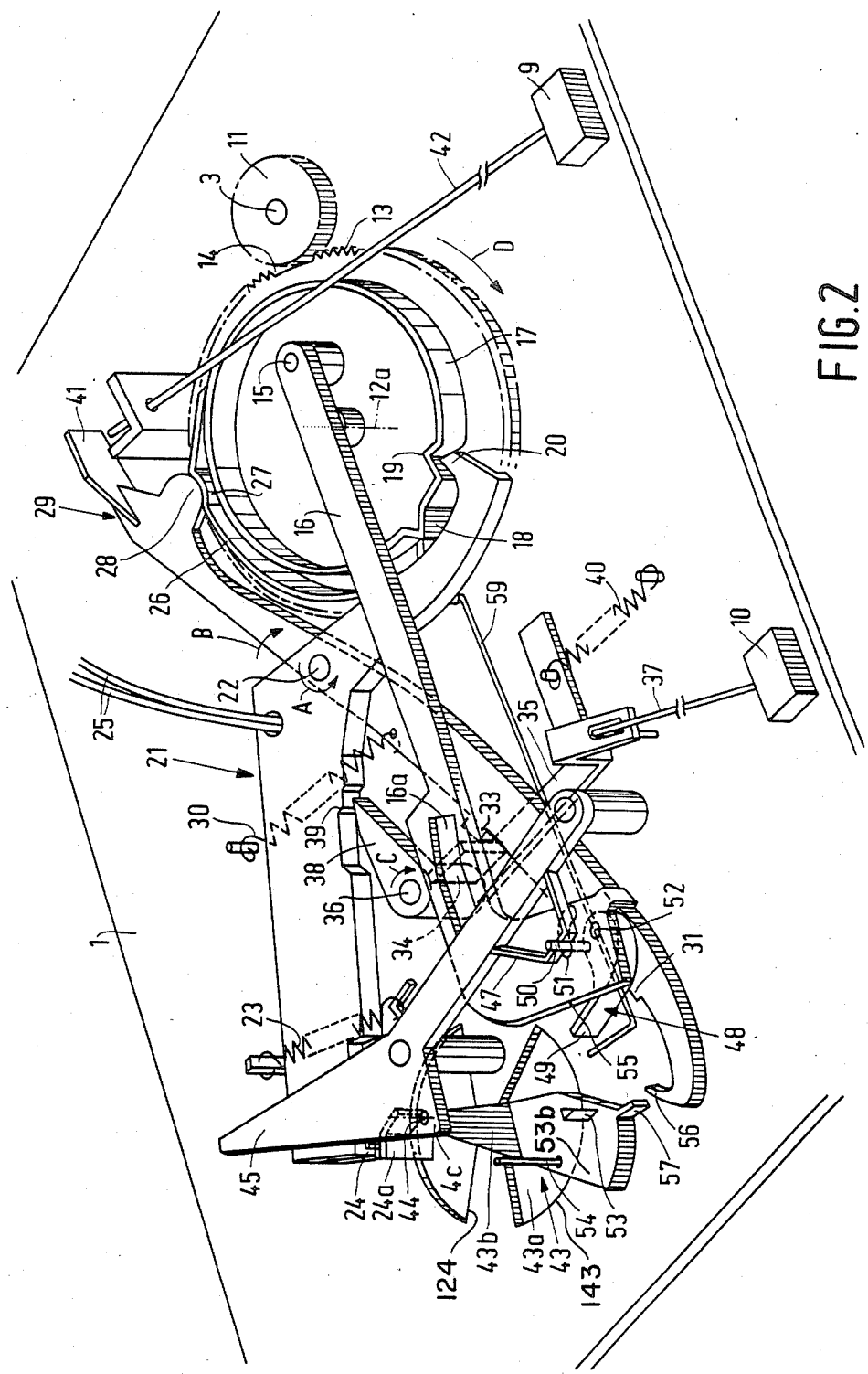
FIG. 2 is a perspective bottom view of the control device of a first embodiment of the invention in the rest position.

In addition, the member 29 comprises a projection 33 which in the position shown in FIG. 2 is situated close to an abutment 34 on a starting member 35. In this position the projection 33 is situated directly opposite the abutment 34. The starting member 35 is pivotable about a spindle 36 and is connected to the start button 10 by means of an actuating rod 37. The member 35 further comprises a latching hook 38 which is clear of a shoulder 39 on the switching member 21 in the position shown in FIG. 2. A spring 40 tends to pivot the member about the spindle 36 in the direction indicated by the arrow C, a stop, not shown, limiting the pivotal movement of the member 35 in this direction in the position shown.

On its end which is near the protrusion 28 the selection member 29 carries a plate 41 which can cooperate with an actuating element constituted by the end portion of an actuating rod 42 which is connected to the diameter-selection button 9.

Above the deck 1 the pick-up arm 4 is connected to a rotatable base 43 of the arm so as to be pivotable about the spindle 4b. The base 43 comprises a circular disc 43a (see FIGS. 1 and 2) fixed on a support 43b which projects through an opening 143 in the deck 1. The disc 43a also carries the projection 24a which projects through a second opening 124 in the deck 1. At the end which is remote from the disc 43a the support 43b comprises a pivot 44, which is journalled in a supporting member 45 secured to the underside of the deck 1. A bearing, not shown, for the disc 43a on the deck 1 in conjunction with the pivot 44 define the pivotal axis 4c of the pick-up arm 4. The supporting member 45 is provided with a fixed reset surface 47.

At its end which is remote from the spindle 15 the drive rod 16 carries a guide element 48 which is pivotable relative to the rod 16 about a spindle 52 which extends substantially parallel to the turntable shaft 3. The guide element 48 is provided with a hook-shaped portion 49 and with a pin 50 which is guided in an arcuate slot 51 in the drive rod 16. An over-center spring, not shown, always engages in one or the other of two recesses, not shown, in a wall of the guide element 48, so that this element is stably retained in one or the other of two positions. In one of these positions the hook-shaped portion 49 of the element 48 is situated in the path of movement of a coupling element 53 arranged on an arm 53b of the support 43b of the pick-up arm base 43.

The pick-up arm base 43 carries a resilient pin 54 which is engaged by an edge portion 55 on the drive rod 16 to return the pick-up arm 4 to the arm rest 8.

Further parts of the control device of the record player in accordance with the invention will be described in the following description of the operation of the record player.

First, the clip 7 is removed from the pick-up arm 4 so that the arm lies freely on the arm rest 8. Depending on whether the diameter-selection button 9 is depressed or not, a selection is made of the desired speed of the turntable 2 (33⅓ or 45 revolutions per minute) and the diameter of the record to be played (30 or 17 cm). When subsequently the start button 10 is pressed the starting cycle of the player begins. The starting cycle proceeds as follows:

(a) The position of the end of the rod 42 depends on whether or not the button 9 has been depressed.

(b) Upon depression of the button 10 the starting member 35 is pivoted in a direction opposite to that indicated by the arrow C against the force of the spring 40, so that the latching hook 38 on the member 35 is pressed against the switching member 21 to rotate this member in a direction opposite to that indicated by the arrow A to a position in which the portion 20 of the member 21 is disengaged from the recess 19 so that the command disc 12 is free to rotate. The switching member 21 is latched in this position by engagement of the latching hook 38 behind the shoulder 39 on the switching member. Because of the pivotal movement of the member 21 the switch 24 is now clear of the projection 24a on the pick-up arm base 43 closing of the switch 24 causes the motor to start and the turntable 2 together with the turntable 3 and the gear wheel 11 begin to rotate.

(c) During depression of the button 10 the starting member 35 also slightly rotates the command disc 12, in a manner not shown, in the direction indicated by the arrow D, so that the gear wheel 11 meshes with the teeth 13, and the disc 12 is driven and continues to rotate in the direction indicated by the arrows D. As a result of this movement, the rounded protrusion 28 on the selection member 29 is displaced from the recess 27 and subsequently slides on the outer surface of the guide rim 26, causing the member 29 to be pivoted in a direction opposite to that indicated by the arrow B.

Figure 3:
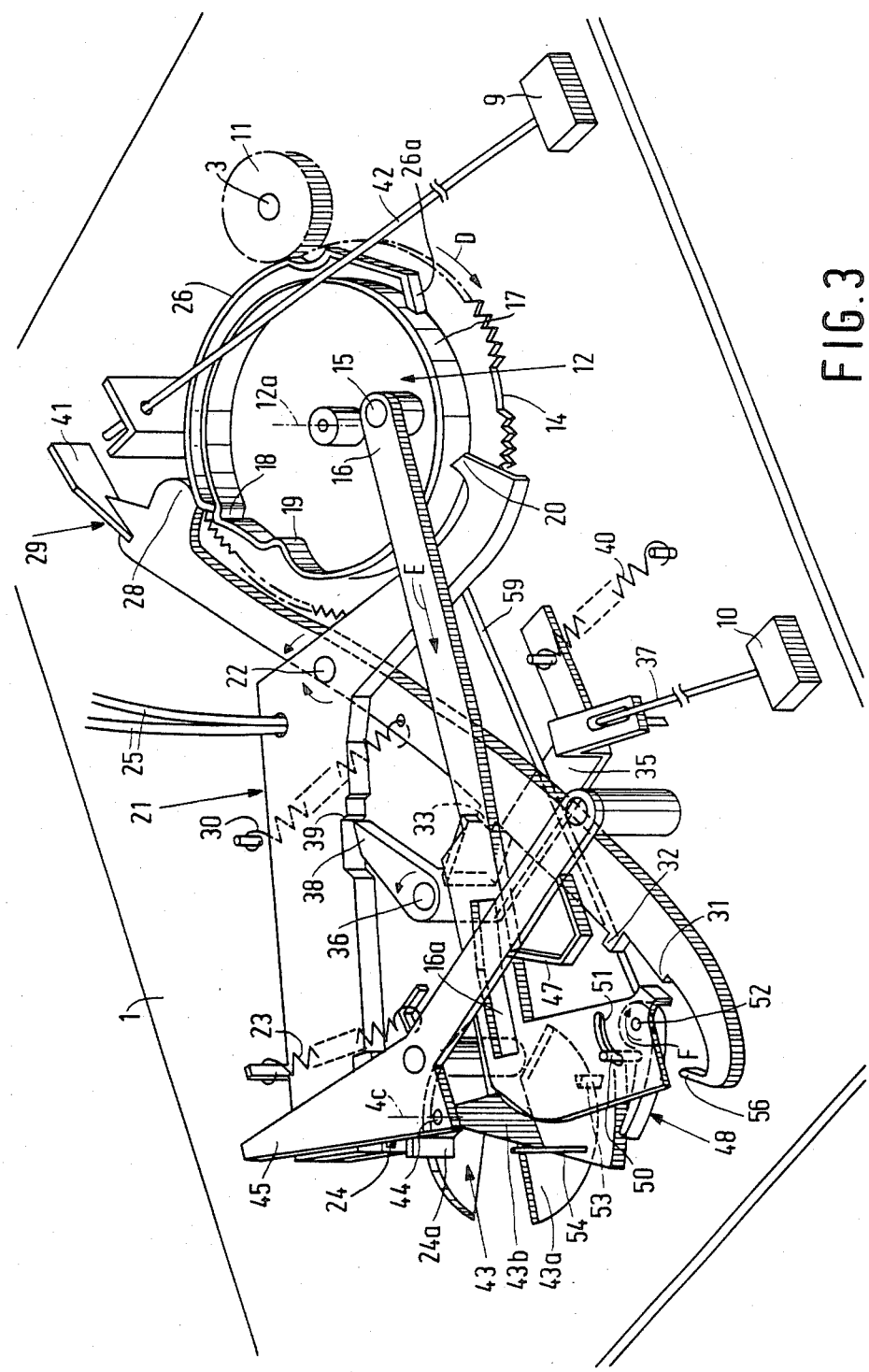
FIG. 3 is a view similar to FIG. 2 showing the control device of FIG. 2 at an early stage in its operation when the drive element is moving forward.
Figure 4:
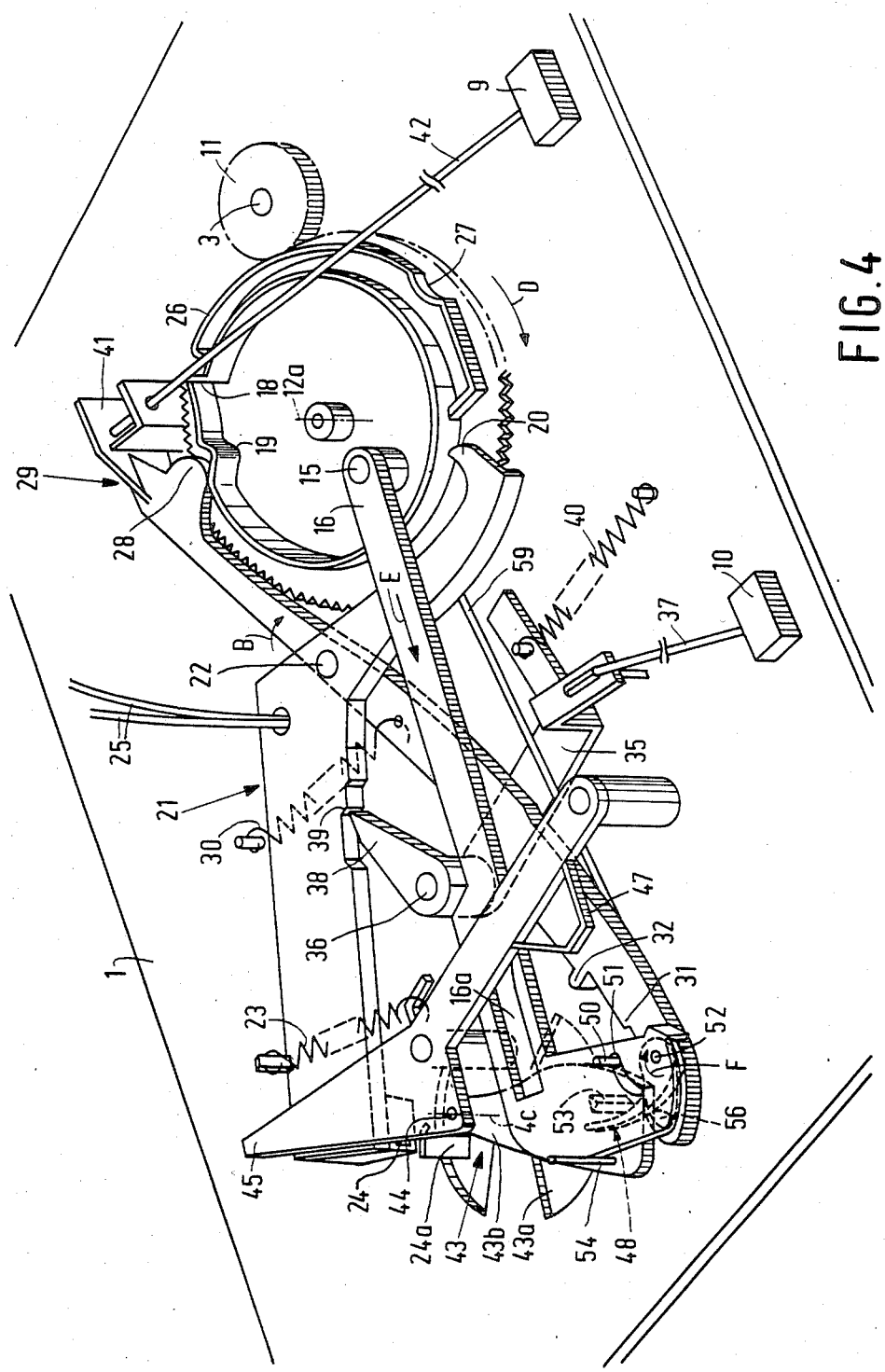
FIG. 4 is a view similar to FIG. 2 showing the control device at a stage when the drive element has almost reached the end of its forward movement and the guide element has engaged the coupling element.

(d) The drive rod 16 and with it the guide element 48 now begin to move to the left as indicated by the arrow E (see FIG. 3). When the end of the guide rim 26 reaches the protrusion 28 the selection member 29 is pivoted back by the spring 30 in the direction indicated by the arrow B (see FIG. 4). This movement of the member 29 is not impeded by the abutment 34 on the starting member 35, because the abutment 34 is now situated to one side of the projection 33 on the member 29 owing to the pivotal movement of the member 35. The movement of the selection member 29 brings a stop 56 formed as a hook-shaped projection on the end of the member 29, into the path of movement of the guide element 48. As a result of the movement of the drive rod 16 in the direction indicated by the arrow E, the guide element 48 contacts the stop 56 during the last stage of the travel of the rod 16 and is pivoted about the spindle 52 in the direction of the arrow F. This pivoting of the guide element 48 moves the pin 50 to a different operative position in the slot 51. The guide element is retained in this position by the over-center spring described above (not shown). The selection member 29 has now pivoted in the direction of the arrow B far enough for the plate 41 to abut the end of the rod 42. Thus, this position of the member 29 depends on the setting of the button 9.

(e) Owing to the pivotal movement of the guide element 48 the hook-shaped portion 49 of this element is situated behind the coupling element 53 at the end of the movement of the drive rod 16 in the direction of the arrow E, with the result that the portion 49 rotates the pick-up arm base 43 and the pick-up arm 4 to move back with the rod 16 in a direction opposite to that indicated by the arrow E. In the meantime the arm 4 has been lifted to the rasied position because at the side of the rod 16 facing the frame 1 the guideway 16a rises gradually in the direction of the arrow E and the lift spindle 6 is lifted by the guideway 16a at the end of the movement of the rod 16.

Figure 5:
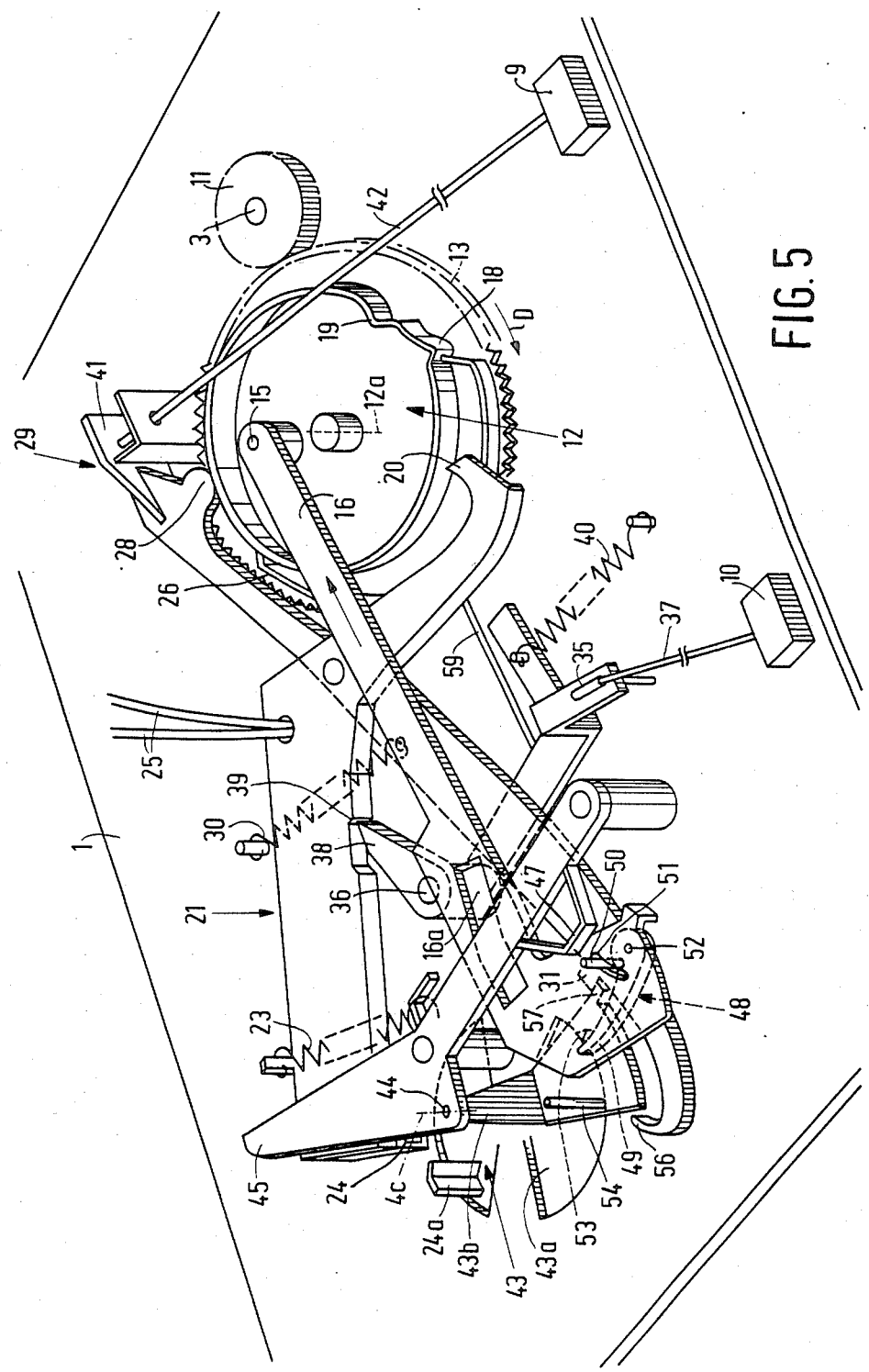
FIG. 5 is a view similar to FIG. 2 showing the control device at a stage when the drive element is performing a return movement and the pick-up arm is positioned above the turntable.
Figure 7:
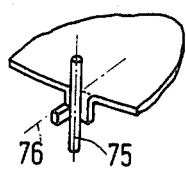
FIG. 7 shows a part of the control device of FIG. 6 on a larger scale.
Figure 8:
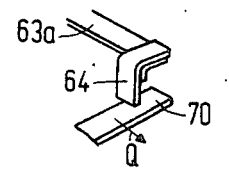
FIG. 8 shows another part of the control device of FIG. 6 on a larger scale.

(f) The pick-up arm base 43 carries an abutment 57 (see FIG. 2) which, during the movement of the base 43 in the present stage of the starting cycle abuts one of the positioning surfaces 31 and 32 on the selection member 29 depending on the position of the member 29 as determined by the button 9. The positioning surface 31 is operative when the button 9 is set to a 30-cm diameter record and the surface 32 is operative when the button is set to a record of 17 cm diameter. The pick-up arm base 43 is now held between the hook-shaped portion 49 of the guide element 48 and the positioning surface 31 or 32, so that a stable position of the arm 4 above the turntable is obtained. In this way the moving mass of the pick-up arm 4 is arrested effectively. At the same time, during positioning of the pick-up arm 4 above the turntable shocks or vibrations, to which the record player is subjected, have no adverse effect on the position of the pick-up arm. FIG. 5 shows the position of the abutment 57 against the positioning surface 31 when the button 9 is set to a record of 30 cm diameter.

(g) During the return movement of the rod 16 the abutment 57 remains briefly in abutment with the positioning surface 31 or 32 and the hook-shaped portion 49 of the guide element 48 can slide away from behind the coupling element 53 due to pivoting of the guide element out of the stable position defined by the over-center spring. The portion 49 thus becomes disengaged from this element 53. Immediately after this the protrusion 28 on the selection member 29 is engaged by a cam surface 26a at the beginning of the guide rim 26 and the member 29 is thereby pivoted to move the positioning surfaces 31 and 32 away from the abutment 57 so that the pick-up arm base 43 and therefore the pick-up arm 4 are released. At this instant the arm 4 is still situated on the lift support 5.

(h) The further movement of the rod 16 in the direction opposite to that indicated by the arrow E brings the pin 50 against the reset surface 47 at the end of the travel of the rod 16. As a result of this, the surface 47 causes the guide element 48 to be pivoted back about the spindle 52 into the inoperative initial position, so that the element 48 again occupies the stable initial position shown in FIG. 2.

(i) The hook portion 20 of the switching member 21 is now engaged by the cam surface 18 on the command disc 12 and the member 21 is thereby pivoted in a direction opposite to that indicated by the arrow A to become disengaged from the latching hook 38. Under the influence of the spring 40 the starting member 35 moves back in the direction indicated by the arrow C to the position shown in FIG. 2 and the abutment 34 is again situated directly opposite the projection 33 on the selection member 29.

(j) Subsequently, the protrusion 28 on the selection member 29 move into the recess 27 in the guide rim 26, the hook portion 20 of the switching member 21 engages the recess 19 in the rim 19 on the command disc 12 and the command disc rotates until the untoothed portion 14 is again situated opposite the gear wheel 11, so that the disc 12 stops. In the meantime during the final stage of the travel of the rod 16 the lift spindle 6 of the pick-up arm 4 has moved downwards together with the support 5 so that the arm 4 has been moved towards the record on the turntable and playing may commence. The arm 4 is then no longer obstructed by the guide element 48 or the selection member 29.

The stop cycle, which can be initiated by moving the arm 4 towards the center of the turntable, but which may also be initiated by depressing a further actuating button 58 (see FIG. 1), includes the following movements of the control device:

(a) At the end of the movement of the pick-up arm 4 over the record the pick-up arm base 43 is coupled to the command disc 12 by means of a rod 59. As a result of this coupling the disc 12 is subsequently rotated slightly in the direction indicated by the arrow D, so that the gear wheel 11 again meshes with the teeth 13 on the disc 12, and the gear wheel 11 causes the disc 12 to rotate further in the direction indicated by the arrow D. In a manner not shown this rotation can also be obtained by pressing the button 58. This leads to a movement of each of members 21 and 29 as already described in the foregoing for the position of the control device as shown in FIG. 3. As a result of the movement of the rod 16 in the direction indicated by the arrow E the arm 4 is lifted immediately after the disc 12 has begun to rotate.

(b) The edge portion 55 of the drive rod 16 now acts against the pin 54 so that the pick-up arm base 43 is moved back and the pick-up arm 4 is returned to the arm rest 8. When the protrusion 28 on the selection member 29 has become disengaged from the guide rim 26 on the command disc 12, the member 29 is pivoted about the spindle 22 by the spring 30 to an operative position which is determined by the engagement of the projection 33 on the member 29 with the abutment 34 on the starting member 35. It is thus important that the abutment 34 is situated exactly opposite the projection 33 at the end of the starting cycle. This ensures that during the stop cycle the member 29 cannot affect the position of the guide element 48 by means of the stop 56, so that the guide element remains in the inoperative position and the positioning surfaces 31 and 32 on the member 29 remain outside the path of movement of the abutment 57, on the pick-up arm base 43. At the end of the return movement of the rod 16 in the direction opposite to that indicated by the arrow E the pick-up arm 4 is again lowered onto the arm rest 8.

(c) At the end of the stop cycle the situation shown in FIG. 2 is reached again. The switch 24 on the member 21 is pressed against the projection 24a on the pick-up arm base 43, which projection has been appropriately positioned in the meantime, and the drive motor stops.

The control device for controlling the pick-up arm 4 as described in the foregoing has the advantage that it requires comparatively few parts having only a small mounting height, so that the record player in accordance with the invention can be accommodated in a comparatively low housing.

SECOND EMBODIMENT

Figure 6:
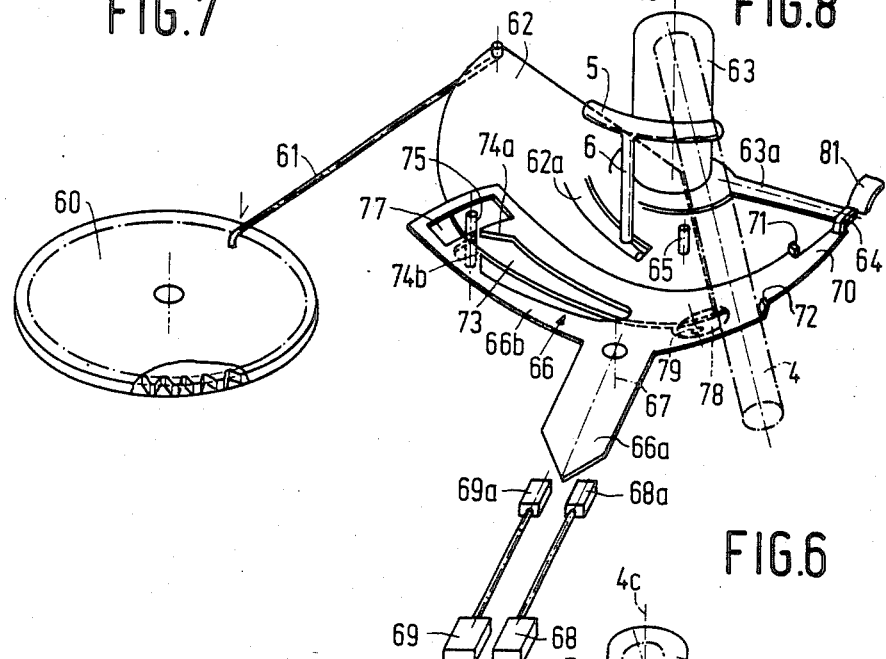
FIG. 6 is a schematic perspective view of the control device of a second embodiment of the invention, shown the rest position.
Figure 9:
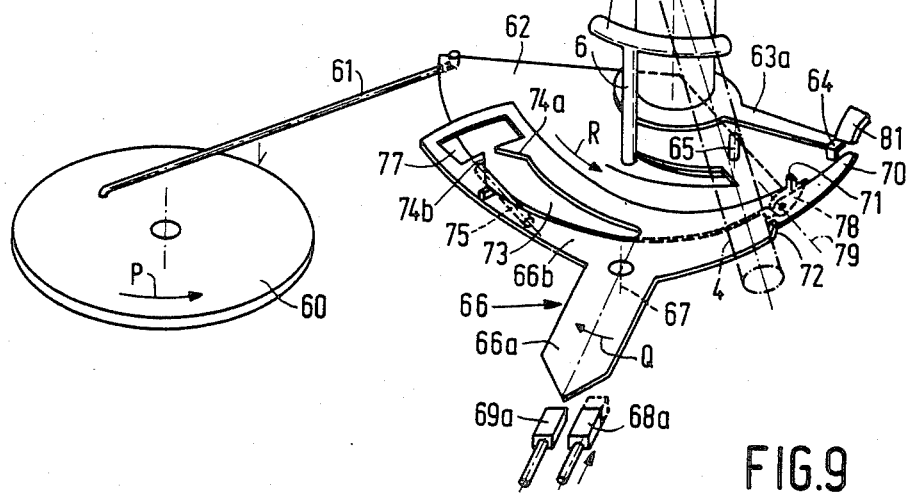
FIG. 9 is a view similar to FIG. 6, showing the drive element during its forward movement and the selection member in an operative position.
Figures 10, 11:
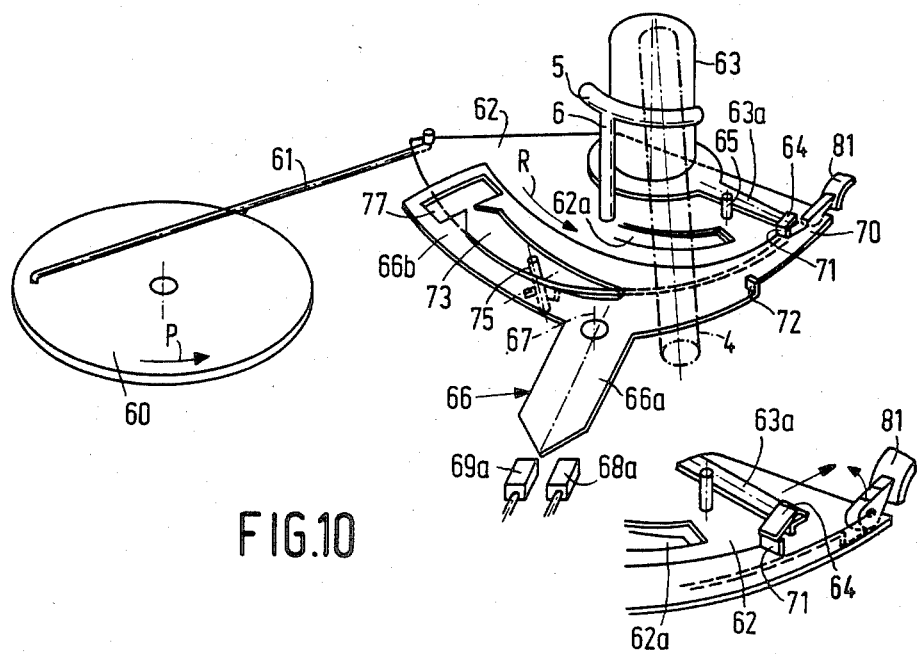
FIG. 10 is a view similar to FIG. 6, showing the drive element at the end of its forward movement, when the guide element is pivoted to the operative position.
FIG. 11 is a perspective view of a part of the control device of FIG. 10 on a larger scale.

The second embodiment, shown in FIGS. 6–16, comprises a command disc 60 which in the situation shown in FIG. 6 is latched in a manner not shown, but in the situation shown in FIGS. 9, 10, 12, 15 and 16 rotates in the direction indicated by the arrow P. The command disc 60 is connected to a reciprocable rod 61 which is pivotally connected to a drive element 62. The element 62 comprises a plate which is shaped as a sector of a circle and has an arcuate edge which faces the command disc 60. In this embodiment the drive element 62 is pivotable about the vertical pivotal axis 4c of the pick-up arm 4, which is mounted on a pick-up arm base 63. In the same way as the pick-up arm base 43 in the first embodiment, the pick-up arm base 63 extends both above and below the deck (not shown) of the record player. Like the first embodiment, this second embodiment comprises a lift support 5 with a lift spindle 6. The lift spindle 6 can be controlled by means of a guideway 62a on the drive element 62, which guideway is formed as a tongue which is bent obliquely downwards from the drive element. The pick-up arm base 63 has an arm 63a on which an abutment 64 is formed (see also FIGS. 8 and 13), which abutment in the manner shown in FIG. 11 is pivotable about a pivotal axis (not shown) which extends substantially radially of the pivotal axis 4c. The drive element 62 is further provided with a pin 65 which returns the pick-up arm 4 to the rest position.

A selection member 66 is arranged on the deck, so as to be pivotable about a pivotal axis 67. The selection member 66 comprises a central actuating portion 66a having a tapered end. The portion 66a can be engaged selectively by means of an actuation portion 68a or 69a of a springloaded actuating button 68 or 69. As is shown in, for example, FIG. 9 depression of the actuating button 68 results in the selection member 66 being pivoted about the pivotal axis 67 in the direction indicated by the arrow Q, while depression of the other actuating button 69 results in the selection member 66 being pivoted in a direction opposite to that indicated by the arrow Q. In a manner to be described hereinafter, depression of the button 68 causes the pick-up arm 4 to be moved towards the turntable to a position corresponding to a 30-cm diameter record; depression of the actuating button 69 positions the pick-up arm 4 above the lead-in groove of a 17-cm diameter record.

The selection member 66 comprises an arcuate portion 66b having a flat tongue 70 which extends towards the arm 63a and which, intermediate its ends and at its proximal end respectively, has vertically extending positioning surfaces 71 and 72. The positioning surface 71 is situated on that side of the portion 66b of the selection member which faces the pick-up arm base 73 and the positioning surface 62 is situated on the opposite side of the portion 66b. Like the positioning surfaces 31 and 32 in the first previous embodiment, the positioning surfaces 62 and 71 can be brought selectively into an operative position in the path described by the abutment 64 when the pick-up arm 4 is moved towards the turntable.

In the portion 66b of the selection member 66 an opening 73 is formed whose dimension measured radially of the pivotal axis 4c increases in a clockwise direction about the axis 4c as viewed in the drawings. The opening 73 terminates in two converging walls 74a and 74b, the ends of the walls being spaced at a distance from each other such as to allow the passage between them of a pin 75 which is pivotally connected to the drive element 62 (see FIG. 7). In the situation shown in FIG. 9 the pin 75 is connected to the drive element 62 so as to be pivotable about a horizontal pivotal axis 76 (FIG. 1). In the position shown in FIG. 6 the pin 75 is situated in an opening 77 in the selection member 66, which opening adjoins the opening 73. The opening 77 is so formed that upon actuation of one of the actuating buttons 68 the movement of the selection member 66 is not impeded.

The drive element 62 further carries a guide element 78 which is pivotable about a spindle 79 which extends substantially radially of the pivotal axis 4c. The guide element 78 has two mutually perpendicular edge portions, against one or the other of which a blade spring 80 bears with an over-center action to retain the guide element 78 stably in one or the other of two positions (compare FIG. 6 and FIG. 13). In order to ensure that in the position shown in FIG. 13 the pick-up arm base 63 is retained correctly during the movement of the pick-up arm base 63a, the guide element 78 is provided with a stepped edge portion 78a. In a manner as shown in FIG. 11 the guide element 78 can abut a stop 81 at the end of the forward movement of the drive element 62, which stop is secured to the frame in a manner not shown.

In the second embodiment the record player with control device operates as follows:

When, for example, the actuating button 68 is depressed the selection member 66, as already stated, is pivoted in the direction indicated by the arrow Q in FIG. 9, so that the positioning surface 71 is moved to the operative position. Depression of a start button, not shown, results in the command disc 60 being rotated in the direction indicated by the arrow P in the same way as in the first embodiment, so that the drive element 62 is pivoted about the pivotal axis 4c in the direction indicated by the arrow R in FIG. 9. As a result, the lift support 5 is moved upwards and the pick-up arm 4 is lifted off the arm rest 8 (FIG. 1). The pivotal movement of the drive element 62 also results in the pin 75 being disengaged from the opening 77, the pivotal arrangement of the pin 75 as shown in FIG. 9 enabling the pin to be pivoted to a horizontal position when it leaves the opening 77 and, subsequently, as it reaches the opening 73 (FIG. 10) to be pivoted back into the vertical position under the influence of a spring, not shown. As the movement of the drive element 62 in the direction indicated by the arrow R continues, the guide element 78 passes to the right (as viewed in the drawings) of the positioning surface 71 on the selection member 66 and abuts the stop 81, as shown in FIG. 11, at the end of the forward movement of the drive element 62. By abutment with the stop 81 the guide element 78 is pivoted from the inoperative position to the operative position.

Figures 12, 13:
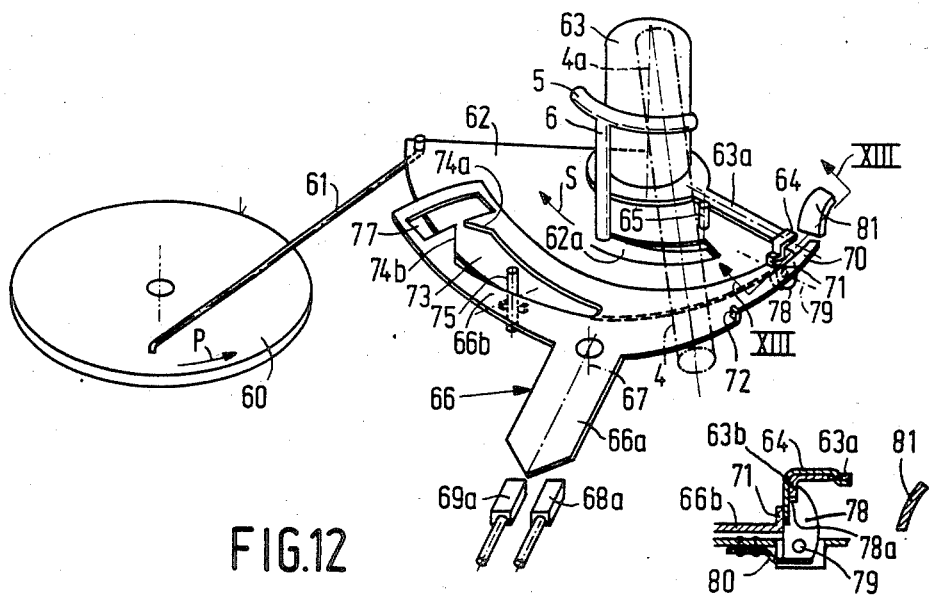
FIG. 12 is a view similar to FIG. 6 showing the situation in which the pick-up arm is positioned above the turntable.
FIG. 13 is a sectional view of a part of the control device taken on the lines XIII—XIII in FIG. 12 and drawn to a larger scale.

During the subsequent return movement of the drive element 62, as indicated by the arrow S in FIG. 12, the pin 75 moves through the opening 73 in the selection member 66, the latter being retained in the position which it occupied before depression of the button 68. During this return movement of the drive element 62 the guide element 78 is pressed against a coupling element 63b formed by a bent edge portion of the arm 63a of the pick-up arm base 63. During this stage of the movement of the drive element 62 the guide element 78 rotates the pick-up arm base 63 to move the pick-up arm 4 towards the turntable 2 (FIG. 1). Because of the stepped shape of its edge portion 78a the guide element 78 is also pressed against the abutment 64 on the arm 63a. The situation shown in FIGS. 12 and 13 is then reached, in which the abutment 64 abuts the positioning surface 71 so that the pick-up arm is positioned above the turntable in the position required for playing a record of 30-cm diameter. In the same way as in the preceding embodiment the pick-up arm 4 is now in a stable position and because of the guide-way 62a shape, the arm is still lifted.

Figure 14:
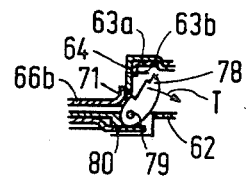
FIG. 14 is a sectional view similar to FIG. 13 showing the guide element poivoted out of the operative position.
Figure 15:
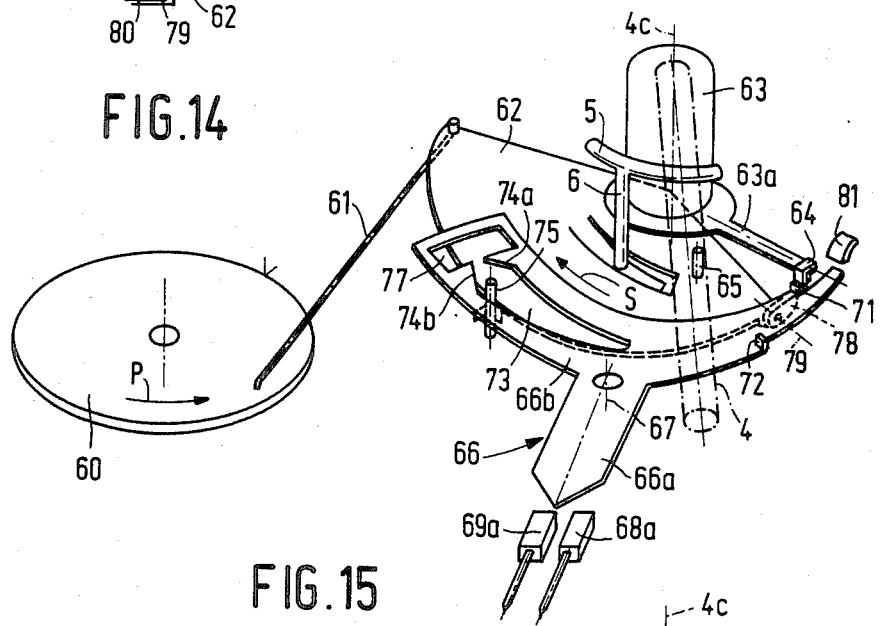
FIG. 15 is a view similar to FIG. 6 showing the drive element during its return movement from the position shown in FIG. 12.

As the movement of the drive element 62 in the direction indicated by the arrow S continues, the guide element 78, due to its engagement with the coupling element 63b and the abutment 64, is pivoted in the direction indicated by the arrow T in FIG. 14 from the operative position into the inoperative position as shown in FIG. 15. It is then firmly retained by the blade spring 80. At this instant the abutment 64 is still in abutment with the positioning surface 71 on the selection member 66.

Figure 16:
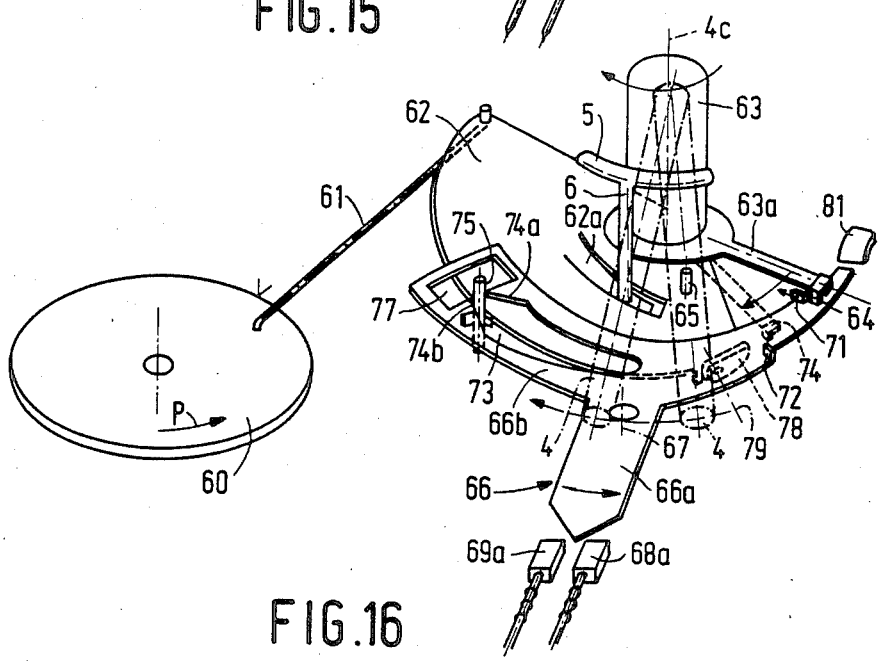
FIG. 16 is a view similar to FIG. 6 showing the selection member pivoted to an inoperative position.

Further rotation of the command disc 60 to the position shown in FIG. 16 causes the pin 75 to be moved between the converging walls 74a and 74b of the opening 73 in the selection member 66. Engagement of the pin 75 with the wall 74b pivots the selection member 66 back to the center position in a direction opposite to that indicated by the arrow Q, at the end of the return movement of the drive element 62. Consequently, the abutment 64 is disengaged from the positioning surface 71 and the lift spindle 6 is guided in a downward direction by the guideway 62a, so that the arm 4 is lowered onto the turntable. At this instant the pin 75 has again engaged the opening 77 and occupies the position shown in FIG. 6, while in the same way as in the first embodiment the disc 60 is stopped by the disengagement of a drive wheel, not shown. The record can now be played. The pick-up arm base 63 with the abutment 64 is then not impeded by the positioning surfaces 71 and 72, because the selection member 66 has been set to the center position by the action of the pin 75.

When the end of the record is reached, or upon actuation of the actuating button 58 (FIG. 1), the command disc 60 is started again and begins to rotate in the direction indicated by the arrow P. The drive element 62 is then pivoted about the axis 4c in the direction indicated by the arrow R, the lift support 5 being lifted again so that the pick-up arm 4 is also lifted. For returning the pick-up arm 4 from the turntable to the arm rest 8 the pin 65 on the drive element 62 pushes back the arm 63a of the pick-up arm base 63. It is then an advantage that even if at this instant the selection member 66 is positioned by reactuation of the actuating button 68, the pin 75 can still move into the opening 73 because of the pivotal arrangement (compare FIG. 9). Moreover, it is important that the abutment 64 can move past the positioning surface 71 as is shown in FIG. 11, this is possible because the abutment 64 can pivot relative to the arm 63a.

During the return movement the guide element 78 cannot influence the arm base 63 because the guide is still situated underneath the portion 70 of the selection member 66. The guide element abuts with the stop 81 only at the end of the movement as shown in FIG. 11.

If the button 68 is depressed the guide element pivots from the inoperative position to the operative position and remains in this position, so that the pick-up arm 4 can again be moved towards the turntable. However, if the selection member 66 is still in the center position because the actuating button 68 is not actuated at this instant, the guide element slides along the underside of the tongue 70, so that after having been pivoted to the operative position by the stop 81 the guide element abuts with the free end of the tongue 70 immediately after the start of the return movement of the drive element 62, thereby causing the guide element 78 to be pivoted back directly to the inoperative position. As a result the guide element cannot influence the position of the coupling element 63b on the arm 63a of the pick-up arm base 63 during pivotal return movement of the drive element 72. The pick-up arm 4 then remains on the arm rest 8 and the playing cycle is not repeated.

Figure 17:
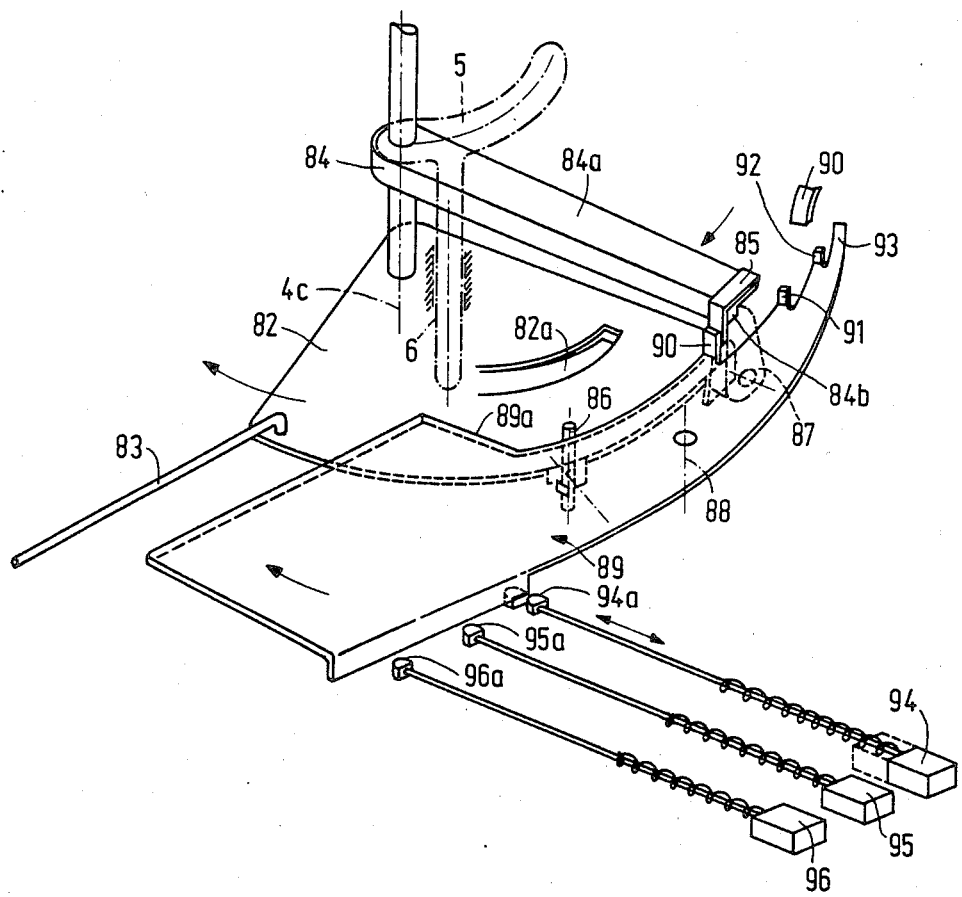
FIG. 17 is a perspective view of a third embodiment of the invention.

The third embodiment, shown in FIG. 17 is a variant of the preceding embodiment and comprises a drive element 82 driven by means of a command disc, not shown, through a rod 83. Like the drive element 62 the drive element 82 is pivotable about the pivotal axis 4c of a pick-up arm base 84, a lift spindle 6 and a lift support 5 connected thereto being moved upwards and downwards by means of a guideway 82a. A pick-up arm base 84 is provided with an arm 84a carrying a pivotable abutment 85 and a coupling element 84b. Similarly, the deck includes a pivotable pin 86 and a guide element 87 is pivotally connected to the drive element 82. The deck, not shown, carries a selection member 89 which is pivotable about an axis 88 and which comprises three positioning surfaces 90, 91 and 92 and a tongue 93 at one end. For setting the disc diameter three actuating buttons 94, 95 and 96 are provided for positioning the arm above a 17 cm, a 25 cm and a 30-cm record, respectively. At their inner ends these actuating buttons are provided with actuating elements 94a, 95a, 96a, which are situated at different radial distances from the pivotal axis 88 and which, upon depression, produce different pivotal movements of the selection member 89. Thus, in the same way as in the preceding embodiment one of the positioning surfaces 90, 91 and 92 is moved into the path of the abutment 85.

THIRD EMBODIMENT

In the third embodiment also the arm 84a is driven after the guide element 87 has been set to the operative position by abutment with a stop 90 at the end of the forward movements of the drive element 82. During the return movement the guide element 87 drives the arm 84a through the coupling element 84b, so that in this embodiment also the pick-up arm 4 is retained stably in the set-down position above the record. A continued return movement of the drive element 82 causes the guide element 87 to be pivoted away towards the inoperative position in the present embodiment subsequently the pin 86 moves along an oblique edge 89a of the selection member 89, thereby causing the selection member to pivot back about the axis 88, so that the initial position of the selection member is reached. During the return movement of the arm 84a a pin, not shown, then enables the guide element 87 to remain underneath the tongue 93, so that the guide element 87 cannot be reactivated if none of the buttons 94, 95 and 96 is depressed.

It is to be noted that in FIG. 17 the button 94 for selection of a 17 cm diameter record is depressed.

The construction shown enables the control device of the record player in accordance with the invention to be used for positioning the pick-up arm 4 in three positions above the turntable. The two embodiments shown in FIGS. 6 to 16 and FIG. 17 have the same advantages as the first embodiment, namely the comparatively small number of parts and the low mounting height of the control device.

What is claimed is:

1. A record player having a turntable, a pick-up arm having a pick-up arm base and a control device for the pick-up arm, comprising
    a command disc, and means for rotating said command disc,
    a reciprocable drive element connected to said command disc and having an end remote from said command disc,
    a guide element pivotally connected to said drive element at said end,
    a coupling element on said pick-up arm base, arranged for engagement by said guide element to guide the pick-up arm towards the turntable,
    an abutment coupled to said pick-up arm, and
    a pivotal selection member having first and second positioning surfaces, arranged such that such surfaces are selectively cooperable with said abutment to position the pick-up arm selectively in a first or second position above the turntable,
    characterized in that said abutment is arranged on the pick-up arm base,
    said guide element is pivotable between an inoperative first stable position and an operative second stable position, said guide element being in said first position during a first movement of the reciprocable drive element, and in the second position during at least part of a return movement of said drive element opposite said first movement, said guide element being engageable with said coupling element to guide the pick-up arm when said guide element is in said second position only,
    the device further comprises a stop disposed on said selection member, pivotal movement of said selection member moving said stop between an operative and an inoperative position; in said member operative position said guide element abutting said stop at the end of said first movement, abutment with said stop pivoting said guide element to the second position; and in the member inoperative position the stop being clear of said guide element,
    means for pivoting said guide element out of said second position so as to disengage said guide element from said coupling element, during said return movement of the drive element after said abutment abuts the selected one of said positioning surfaces, and
    means, responsive to movement of said command disc after the guide element has been disengaged from the coupling element, for pivoting said selection member to move the selected positioning surface out of the path of the abutment on the pick-up arm base.

2. A record player as claimed in claim 1, characterized in that said stop for the guide element is constituted by a hook-shaped projection at a free end of the selection member.

3. A record player as claimed in claim 2, characterized by comprising means, including a fixed reset surface arranged to abut said guide element, for pivoting said guide element to the first position during the return movement of the drive element, after disengagement from the coupling element.

4. A record player as claimed in claim 3, characterized by comprising a spring-loaded pivotal starting member having an abutment arranged in an inoperative position when said pick-up arm is moved toward the turntable; and when the pick-up arm is moved away from the turntable, said starting member abutment is in an operative position opposite a part of the selection member for pivoting said selection member such that the positioning surfaces and the stop for the guide element are moved to their inoperative positions outside respective paths of movement of the abutment on the pick-up arm base and the guide element.

5. A record player as claimed in claim 4, characterized by comprising a pivotal switching member having a shoulder,
    a latching hook forming part of said starting member and arranged to engage behind said shoulder when the pick-up arm is moved toward the turntable in the inoperative position of the abutment on the starting member, and
    means responsive to movement of said command disc for causing said switching member to release the starting member when the pick-up arm has been positioned above the turntable.

6. A record player as claimed in claim 2, characterized by comprising a spring-loaded pivotal starting member having an abutment arranged in an inoperative position when said pick-up arm is moved toward the turntable; and when the pick-up arm is moved away from the turntable, said starting member abutment is in an operative position opposite a part of the selection member for pivoting said selection member such that the positioning surfaces and the stop for the guide element are moved to their inoperative positions outside respective paths of movement of the abutment on the pick-up arm base and the guide element.

7. A record player as claimed in claim 6, characterized by comprising a pivotal switching member having a shoulder,
    a latching hook forming part of said starting member and arranged to engage behind said shoulder when the pick-up arm is moved toward the turntable in the inoperative position of the abutment on the starting member, and
    means responsive to movement of said command disc for causing said switching member to release the starting member when the pick-up arm has been positioned above the turntable.

8. A record player having a turntable, a pick-up arm having a pick-up arm base and a control device for the pick-up arm, comprising a command disc, and means for rotating said command disc, a reciprocable drive element connected to said command disc, a guide element pivotally connected to said drive element, a coupling element on said pick-up arm base, arranged for engagement by said guide element to guide the pick-up arm towards the turntable, an abutment coupled to said pick-up arm, and a pivotal selection member having first and second positioning surfaces, arranged such that such surfaces are selectively cooperable with said abutment to position the pick-up arm selectively in a first or second position above the turntable, characterized in that said abutment is arranged on the pick-up arm base, said guide element is pivotable between an inoperative first stable position and an operative second stable position, said guide element being in said first position during a first movement of the reciprocable drive element, and in the second position during at least part of a return movement of said drive element opposite said first movement, said guide element being engageable with said coupling element to guide the pick-up arm when said guide element is in said second position only, the device further comprises a stop against which said guide element abuts at the end of said first movement, abutment with said stop pivoting said guide element to the second position, first means for pivoting said guide element out of said second position so as to disengage said guide element from said coupling element, during said return movement of the drive element after said abutment abuts the selected one of said positioning surfaces, means, responsive to movement of said command disc after the guide element has been disengaged from the coupling element, for pivoting said selection member to move the selected positioning surface out of the path of the abutment on the pick-up arm base, and second means, responsive to said selection member being in an inoperative position, for pivoting said guide element back to the first position immediately after the start of the return movement of the drive element.

9. A record player as claimed in claim 8, characterized by comprising means, including an actuating element, for applying spring force, during disengagement of the guide element and the coupling element, to position said selection member, said actuating element being set selectively in one of two positions responsive to selection of one of said first and second positioning surfaces.

10. A record player as claimed in claim 9, characterized in that said stop for the guide element is arranged on said selection member, and pivotal movement of the selection member moves said stop between an operative and an inoperative position.

11. A record player as claimed in claim 10, characterized in that said stop for the guide element is constituted by a hook-shaped projection at a free end of the selection member.

12. A record player as claimed in claim 8, characterized in that said second means includes a third positioning surface formed on said selection member, said guide element abutting said third positioning surface immediately after the start of the return movement of the drive element when the selection member is in the inoperative position.

13. A record player as claimed in claim 8, characterized by comprising means, including a fixed reset surface arranged to abut said guide element, for pivoting said guide element to the first position during the return movement of the drive element, after disengagement from the coupling element.

14. A record player as claimed in claim 13, characterized by comprising a spring-loaded pivotal starting member having an abutment arranged in an inoperative position when said pick-up arm is moved toward the turntable; and when the pick-up arm is moved away from the turntable, said starting member abutment is in an operative position opposite a part of the selection member for pivoting said selection member such that the positioning surfaces and the stop for the guide element are moved to their inoperative positions outside respective paths of movement of the abutment on the pick-up arm base and the guide element.

15. A record player as claimed in claim 14, characterized by comprising a pivotal switching member having a shoulder, a latching hook forming part of said starting member and arranged to engage behind said shoulder when the pick-up arm is moved toward the turntable in the inoperative position of the abutment on the starting member, and means responsive to movement of said command disc for causing said switching member to release the starting member when the pick-up arm has been positioned above the turntable.

16. A record player as claimed in claim 8, characterized by comprising a spring-loaded pivotal starting member having an abutment arranged in an inoperative position when said pick-up arm is moved toward the turntable; and when the pick-up arm is moved away from the turntable, said starting member abutment is in an operative position opposite a part of the selection member for pivoting said selection member such that the positioning surfaces and the stop for the guide element are moved to their inoperative positions outside respective paths of movement of the abutment on the pick-up arm base and the guide element.

17. A record player as claimed in claim 16, characterized by comprising a pivotal switching member having a shoulder, a latching hook forming part of said starting member and arranged to engage behind said shoulder when the pick-up arm is moved toward the turntable in the inoperative position of the abutment on the starting member, and means responsive to movement of said command disc for causing said switching member to release the starting member when the pick-up arm has been positioned above the turntable.

18. A record player as claimed in claim 12, characterized in that said third positioning surface is constituted by a free end of a flat tongue, adjacent said first and second positioning surfaces.

19. A record player as claimed in claim 18, characterized in that said first positioning surface is disposed to one side of said tongue, and the second positioning surface is disposed to the opposite side of said tongue.

20. A record player as claimed in claim 19, characterized in that said means for pivoting said selection member comprises a control element pivotally connected to the drive element, during at least a part of the return movement of said drive element said control element being in an operative position for pivoting said selection member into an inoperative position in which said positioning surfaces are clear of the path of said abutment on the pick-up arm base.

21. A record player as claimed in claim 20, characterized in that said selection member comprises two convergent guide walls arranged such that, during said part of the return movement of the drive element said control element moves between said convergent guide walls, such that control element sets the selection member to said inoperative position at the end of the movement between the guide walls.

22. A record player as claimed in claim 21, characterized in that, at the beginning of the forward movement of the drive element, the control element is disengaged from said selection member and is spaced from a location on the selection member at which said two convergent guide walls terminate.

23. A record player as claimed in claim 22, characterized in that during continued forward movement of the drive element, after abutment against the selection member at said location, said control element is pivoted into an inoperative position.

24. A record player as claimed in claim 22, characterized in that said drive element is pivotable about an axis which is substantially coaxial with the pick-up arm pivotal axis, and said first, second and third positioning surfaces are disposed on a portion of the selection member curved substantially concentrically with the pick-up arm axis, said first positioning surface being disposed at a smaller distance, and said second position being disposed at a greater distance, than the third positioning surface from the pivotal axis of the pick-up arm.

25. A record player as claimed in claim 21, characterized in that said convergent guide walls of the selection member bound a recess formed in a further arcuate portion of the selection member, said further arcuate portion being substantially concentrically curved with said pick-up arm access.

26. A record player as claimed in claim 25, characterized in that said selection member has an actuating portion, said layer comprises actuating means for engaging said actuating portion to pivot the selection member to one of its operativ positions, and viewed in a direction relative to said pivotal axis of the selection member said guide walls and said first and second positioning surfaces are disposed near a side of the selection member facing the pick-up arm axis, and the actuating portion is disposed near a side of the selection member remote from said pick-up arm axis.

27. A record player having a turntable, a pick-up arm having a pick-up arm base and a control device for the pick-up arm, comprising a command disc, and means for rotating said command disc, a reciprocable drive element connected to said command disc for performing a first movement and a return movement in a direction opposite said first movement, a guide element pivotally connected to said drive element, a coupling element on said pick-up arm base, arranged for engagement by said guide element to guide the pick-up arm towards the turntable.

an abutment coupled to said pick-up arm, and a pivotal selection member having first and second positioning surfaces, arranged such that such surfaces are selectively cooperable with said abutment to position the pick-up arm selectively in a first or second position above the turntable during said return movement of said drive element, characterized by comprising a control element pivotally connected to said drive element, arranged such that during at least a part of said return movement said control element is in an operative position for engaging said selection member and positioning said selection member into an inoperative position in which said positioning surfaces are clear of the path of said abutment.

28. A record player as claimed in claim 27, characterized in that said selection member comprises two convergent guide walls arranged such that, during said part of the return movement of the drive element said control element moves between said convergent guide walls, such that the control element sets the selection member to said inoperative position at the end of the movement between the guide walls.

29. A record player as claimed in claim 28, characterized in that said drive element and said pick-up arm base are respectively pivotable about pivotal axes which are substantially coaxial, and said control element pivots with respect to said drive element about an axis which is substantially radial with respect to the drive element pivotal axis, and said convergent guide walls of the selection member bound a recess formed in a further arcuate portion of the selection member, said further arcuate portion being substantially concentrically curved with said pick-up arm access.

30. A record player as claimed in claim 28, characterized in that, at the beginning of the forward movement of the drive element, the control element is disengaged from said selection member and is spaced from a location on the selection member at which said two convergent guide walls terminate.

31. A record player as claimed in claim 29, characterized in that during continued forward movement of the drive element, after abutment against the selection member at said location, said control element is pivoted into an inoperative position.

* * * * *

UNITED STATES PATENT AND TRADEMARK OFFICE
CERTIFICATE OF CORRECTION

PATENT NO. : 4,701,903
DATED : October 20, 1987
INVENTOR(S) : Hermanus F. Einhaus It is certified that error appears in the above-identified patent and that said Letters Patent is hereby corrected as shown below:

IN THE CLAIMS

| | |
|---|---|
| Claim 1, line 16 | change "such" second instance to --said-- |
| Claim 8, line 15 | change "such" second instance to --said-- |
| Claim 25, line 6 | change "access" to --axis-- |
| Claim 28, line 4 | after "element" insert --,-- |
| Claim 29, line 12 | change "access" to --axis-- |

Signed and Sealed this

Twenty-ninth Day of November, 1988

Attest:

DONALD J. QUIGG

*Attesting Officer*   *Commissioner of Patents and Trademarks*